(No Model.)  2 Sheets—Sheet 1.

J. STEVENSON.
BOX FOR BLACKING.

No. 555,410. Patented Feb. 25, 1896.

WITNESSES.
Arthur Hindle
Philip H. Whitaker

INVENTOR.
John Stevenson (No Model.)　　　　J. STEVENSON.　　2 Sheets—Sheet 2.
BOX FOR BLACKING.

No. 555,410.　　　　　　　Patented Feb. 25, 1896.

WITNESSES.　　　　　　　INVENTOR.
Arthur Hindle
Philip H. Whitaker　　　　John Stevenson

UNITED STATES PATENT OFFICE.

JOHN STEVENSON, OF BLACKBURN, ENGLAND, ASSIGNOR TO JAMES ANDERTON SUTCLIFFE, OF SAME PLACE, AND GEORGE PALEY, OF PRESTON, ENGLAND.

BOX FOR BLACKING.

SPECIFICATION forming part of Letters Patent No. 555,410, dated February 25, 1896.

Application filed September 21, 1895. Serial No. 563,220. (No model.)

*To all whom it may concern:*

Be it known that I, JOHN STEVENSON, a subject of Her Majesty the Queen of Great Britain, residing at Blackburn, in the county of Lancaster, England, have invented a certain new and useful Improvement in Boxes for Blacking and Similar Substances, of which the following is a specification.

This invention relates to improvements in the construction of boxes or pots for blacking and other substances which are required to be kept in a moist condition, the object being to construct a box or pot in which a supply of blacking can be kept in a moist state for a long period without renewing the supply of water or other damping medium, there being a reservoir for a supply of liquid, which automatically maintains the contents of the box in a moist condition.

Figure 1:
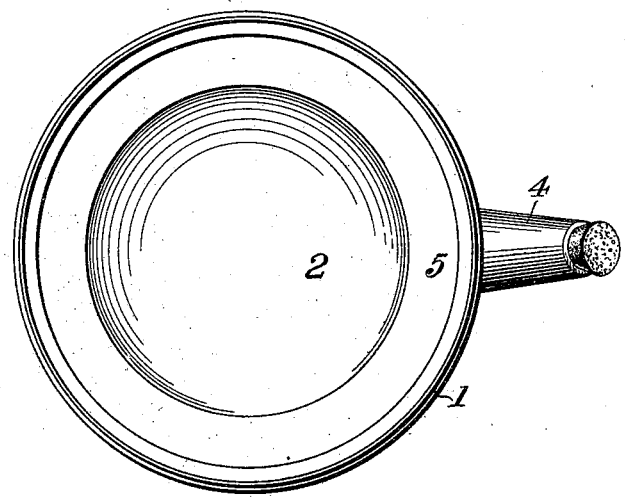
Figure 2:
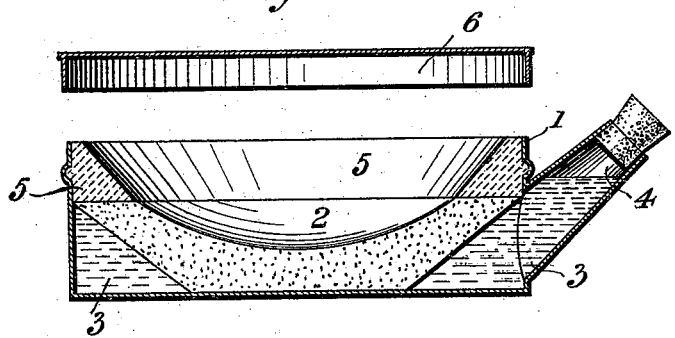
Figure 3:
Figure 4:
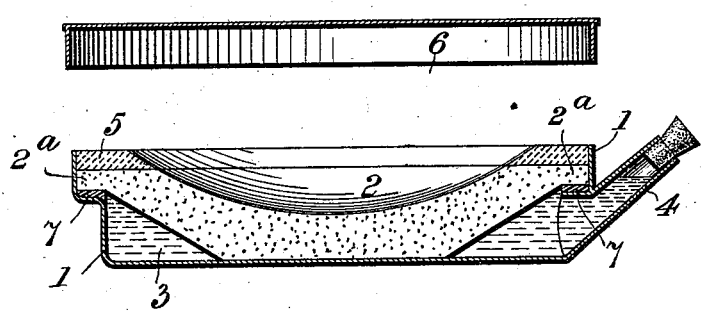
Figure 5:
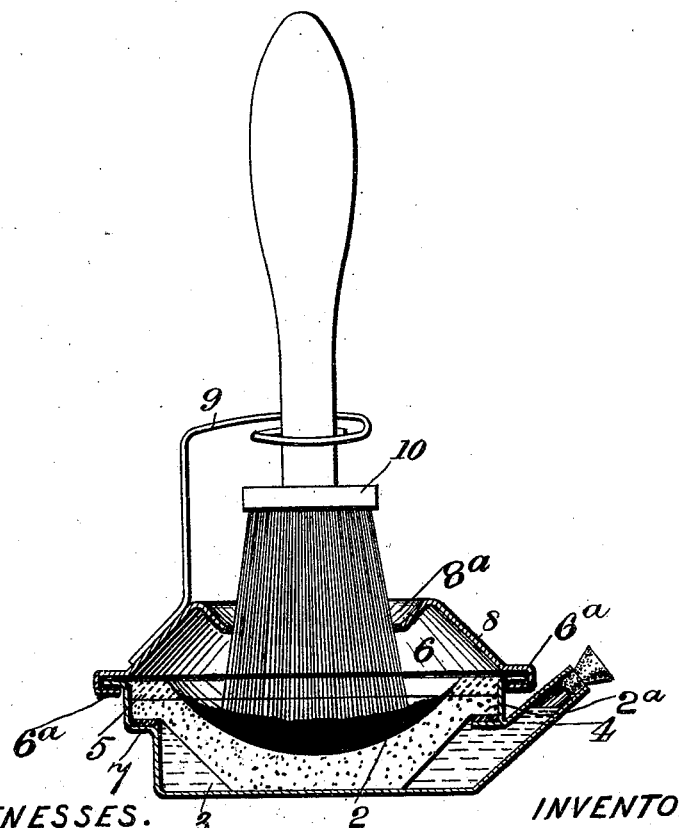

In the accompanying drawings, Figure 1 is a plan of the improved box, the lid or cover being removed. Fig. 2 is a sectional elevation of the improved box and lid or cover, the latter being removed from the box. Fig. 3 shows the inner dish removed. Fig. 4 is a sectional elevation of a modification of the box, the lid being removed from the box. Fig. 5 is a sectional elevation of a modified form of box and lid combined and adapted for carrying a brush.

According to this invention I employ a box 1, preferably of tin, and inside this is placed a dish or saucer 2 of open-grained wood, unglazed earthenware, or other porous material, such dish or saucer 2 being beveled or recessed on its side or under side, so as to leave a water-space 3 between the saucer or dish 2 and the box 1. The box 1 has a tube or pipe 4 fixed in it, so that a supply of water or other damping liquid can be poured into the water-space 3, after which the tube or pipe 4 is closed by a cork, plug, or screw-cap, or it may have simply an opening which is closed by a cork or plug. In order to prevent the damping liquid escaping between the edge of the saucer or dish 2 and the box 1, the edge of the saucer or dish is luted or calked with cement or putty 5, or the upper edge of the box 1 can be spun or turned over the edge of the saucer or dish 2. This calking of the edge of the saucer or dish 2 prevents the damping liquid permeating through any other part of the saucer or dish 2 than is contiguous to the center of same, so that the edge of the box remains dry. The cement may be shaped inside, as shown, to conform to the shape of the inside of the dish 2, which shape is convenient for the removal of the blacking paste or the like.

In Fig. 4 the box 1 is provided with a ledge 7 on which a layer of white lead is laid, after which the saucer or dish 2, which is provided with a flange $2^a$, is placed in position and calked with putty or cement 5.

The blacking or other substance is placed in the dish or saucer 2 and the damping liquid permeates such dish or saucer 2 and maintains the blacking in a moist condition. The height of the damping liquid in the water-space 3 is at a higher level than the center of the dish or saucer 2, and the consequent tendency is for the liquid to find its way to the blacking or other substance.

The box 1 can be covered by a detachable lid or cover 6, or such lid may, if desired, be spun or fixed to the box and adapted for carrying a brush. In the arrangement shown in Fig. 5 the lid is spun or fixed to the box at $6^a$ and provided with a cone-shaped part 8, having a hole $8^a$, adapted for allowing the brush 10 to pass to the blacking in the interior of the box, while the brush itself is supported by a wire 9, which is bent to partly encircle the handle and is soldered or secured to the side of the cone 8.

What I claim is—

1. In a receptacle for blacking, the combination with an outer water-tight box, provided with a neck for filling, and means for closing same; of an inner porous dish the upper edge of which fits snugly within said outer box, said porous dish having downwardly-converging sides, and having its bottom resting upon the bottom of said outer box, thus leaving a space between the sides of said outer box and said inner dish; and a luting of cement around the upper edge of said porous dish; and a cover, substantially as described.

2. In a receptacle for blacking, the combination with an outer water-tight box, provided with a neck for filling, and means for closing same; of an inner porous dish the upper edge of which fits snugly within said outer box, said porous dish having downwardly-converging sides, and having its bottom resting upon the bottom of said outer box, thus leaving a space between the sides of said outer box and said inner dish; a luting of cement around the upper edge of said porous dish; a raised cover provided with a hole to admit a brush; and a holder for the brush secured to said cover, substantially as described.

3. In combination, an outer box, an inner dish of porous material recessed on its side, a water-space formed by such recessed side, an inlet-way for the water, means for closing same, a luting of cement around the upper edge of the porous dish, and a cover, substantially as described.

In testimony whereof I have hereunto set my hand in the presence of two subscribing witnesses.

JOHN STEVENSON.

Witnesses:
ARTHUR HINDLE,
PHILIP H. WHITAKER.